US006717944B1

(12) United States Patent
Bryden et al.

(10) Patent No.: US 6,717,944 B1
(45) Date of Patent: Apr. 6, 2004

(54) SYSTEM, DEVICE, AND METHOD FOR ALLOCATING VIRTUAL CIRCUITS IN A COMMUNICATION NETWORK

(75) Inventors: Simon Bryden, La Roquette sur Siagne (FR); Robert Pluim, Biot (FR); Marcel Wiget, Juan les Pins (FR); Geoffrey A. Mattson, Antibes (FR)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/437,927

(22) Filed: Nov. 10, 1999

(51) Int. Cl.[7] ............................................... H04L 12/56
(52) U.S. Cl. ....................... 370/392; 370/401; 370/409; 370/466
(58) Field of Search ................................. 370/389, 392, 370/400, 401, 402, 409, 397, 399, 395.31, 465, 466, 471

(56) References Cited

U.S. PATENT DOCUMENTS 6,154,839 A * 11/2000 Arrow et al. ................ 713/154
6,301,229 B1 * 10/2001 Araujo et al. ............... 370/401

* cited by examiner

Primary Examiner—Chau Nguyen
Assistant Examiner—Soon-Dong Hyun
(74) Attorney, Agent, or Firm—Bromberg & Sunstein LLP

(57) ABSTRACT

A system, device, and method for allocating virtual circuits in a communication network allocates a virtual circuit for a particular device, establishes a tunnel for communicating with a second device, and maps the virtual circuit to the tunnel based upon an address resolution request received over either the virtual circuit or the tunnel. Protocol messages received over the virtual circuit are forwarded over the corresponding tunnel. Protocol messages received over the tunnel are forwarded over the corresponding virtual circuit.

52 Claims, 11 Drawing Sheets

SYSTEM, DEVICE, AND METHOD FOR ALLOCATING VIRTUAL CIRCUITS IN A COMMUNICATION NETWORK

FIELD OF THE INVENTION

The present invention relates generally to computer communication systems, and more particularly to internetworking Frame Relay devices over an Internet Protocol network using a Virtual Private Network.

BACKGROUND OF THE INVENTION

In today's information age, it is very common for computers and computer peripherals to be internetworked over a communication network. One popular networking application allows multiple customers to use the communication network simultaneously. Network resources are allocated to each customer in such a way that each customer appears to have its own private network. For convenience, the network resources allocated to each customer are referred to collectively as a Virtual Private Network (VPN).

FIG. 1 shows an exemplary communication system 100 in which two CPE nodes (102, 106) are interconnected over a VPN.(104). The VPN (104) is maintained by a service provider, which may be the customer itself or a third-party service provider. The service provider may maintain multiple VPNs over a single communication network.

The VPN (104) includes a number of interconnected edge nodes. Each CPE node (102, 106) interfaces with the VPN (104) through one of the interconnected edge nodes. The edge nodes enable the CPE nodes (102, 106) to communicate over the VPN (104).

In a common networking application, each CPE node (102, 106) interfaces with VPN (104) using Frame Relay connections. Each CPE node (102, 106) interfaces with an edge node through a Frame Relay interface. Frame Relay virtual circuits are maintained through the Frame Relay Local Management Interface (LMI).

In addition to using Frame Relay for accessing the VPN (104), the edge nodes may also communicate using Frame Relay. FIG. 2 shows an exemplary communication network 200 in which the edge nodes are interconnected over a Frame Relay backbone network (204). For convenience, only two edge nodes (202, 206) and two CPE nodes (102, 106) are shown, although the VPN (104) will typically include additional edge nodes and CPE nodes. In the exemplary communication network 200, the CPE node (102) interfaces with the VPN (104) over a Frame Relay connection to the edge node (202), while the CPE node (106) interfaces with the VPN (104) over a Frame Relay connection to the edge node (206). The CPE nodes (102, 106) communicate over a Frame Relay virtual circuit between the edge node (202) and the edge node (206).

With the increasing popularity of Internet Protocol (IP) networking, it is common for the service provider to migrate the VPN (104) from Frame Relay to IP. However, in order to maintain compatibility with existing customers and provide easy configuration for new customers, it is desirable for the CPE nodes (102, 106) to continue accessing the VPN (104) using Frame Relay connections.

FIG. 3 shows an exemplary communication network 300 in which the edge nodes are interconnected over an IP backbone network (304). For convenience, only two edge nodes (302, 306) and two CPE nodes (102, 106) are shown, although the VPN (104) will typically include additional edge nodes and CPE nodes. In the exemplary communication network 300, the CPE node (102) interfaces with the VPN (104) over a Frame Relay connection to the edge node (302), while the CPE node (106) interfaces with the VPN (104) over a Frame Relay connection to the edge node (306). The CPE nodes (102, 106) communicate over an IP tunnel between the edge node (302) and the edge node (306).

One way to provide VPN connectivity between the various CPE nodes using Frame Relay connections is for each CPE node (102, 106) to use a single Frame Relay virtual circuit for all communications. Unfortunately, this requires the edge node to demultiplex data traffic that arrives over the single Frame Relay virtual circuit.

Another way to provide VPN connectivity between the various CPE nodes using Frame Relay connections is for each CPE node (102, 106) to use a single Frame Relay virtual circuit for each remote edge node. Unfortunately, this requires the Frame Relay virtual circuits to be provisioned in each edge node initially and after any changes in VPN topology.

SUMMARY OF THE INVENTION

In accordance with one aspect of the invention, virtual circuits are dynamically allocated based upon address resolution requests. An address resolution request causes a communication path to be created from a source node to a destination node across the VPN. In particular, the source node sends the address resolution request to a local edge node over an interface. The address resolution request identifies the destination node as an intended destination node. The local edge node forwards the address resolution request to all remote edge nodes in the VPN. The local edge node and the particular remote edge node that supports the destination node establish a tunnel. The local edge node allocates a first virtual circuit for the source node, and maps the first virtual circuit to the tunnel. Similarly, the remote edge node allocates a second virtual circuit for the destination node, and maps the second virtual circuit to the tunnel. When the source node sends a unicast protocol message over the first virtual circuit, the local edge node determines the tunnel that is mapped to the first virtual circuit, and forwards the unicast protocol message over the tunnel. Upon receiving the unicast protocol message over the tunnel, the remote edge node determines that the second virtual circuit is mapped to the tunnel, and forwards the unicast protocol message to the destination node over the second virtual circuit.

In this way, virtual circuits are dynamically allocated based upon address resolution requests so that the virtual circuits need not be provisioned in each edge node.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention provides VPN connectivity between the various CPE nodes using Frame Relay connections without requiring Frame Relay virtual circuits to be provisioned in the edge nodes. Each CPE node is configured in a traditional "group mode" configuration, with one IP address per Frame Relay interface. The edge nodes dynamically allocate Frame Relay virtual circuits as IP tunnels are established, specifically in response to Address Resolution Protocol (ARP) request messages.

Figure 1:
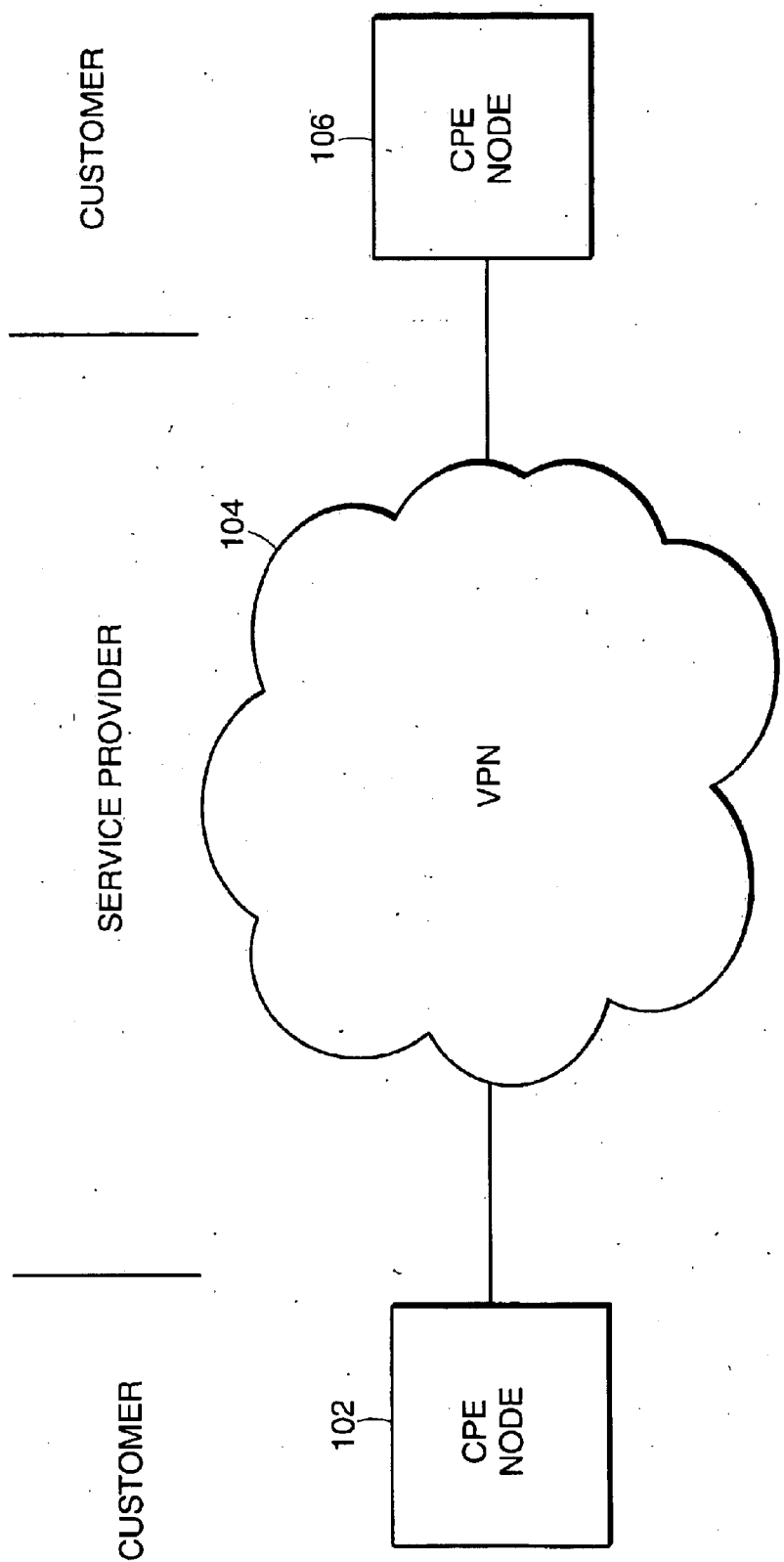
FIG. 1 is a network diagram showing an exemplary communication network in which CPE nodes are interconnected over a virtual private network in accordance with an embodiment of the present invention.
Figure 2:
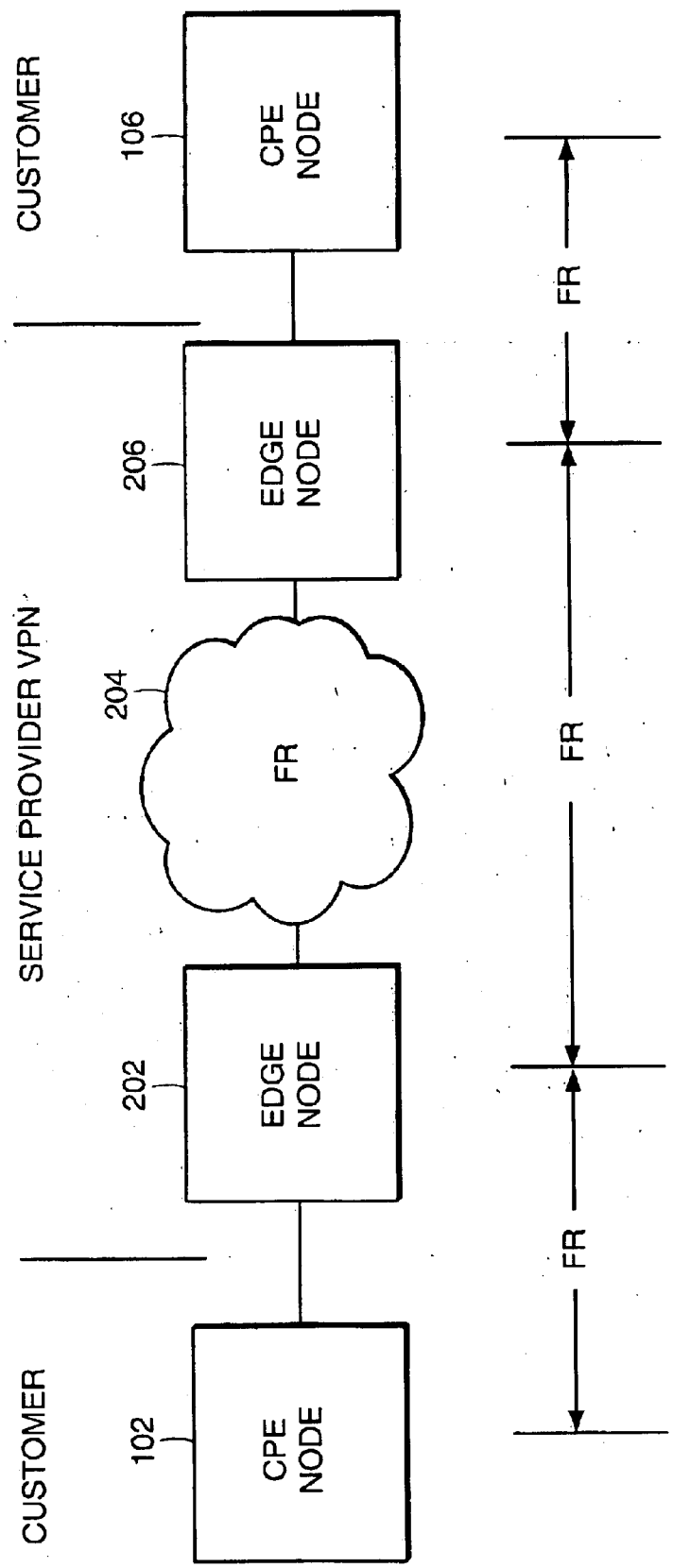
FIG. 2 is a network diagram showing an exemplary communication network in which CPE nodes are interconnected over a frame relay virtual private network as is known in the art.
Figure 3:
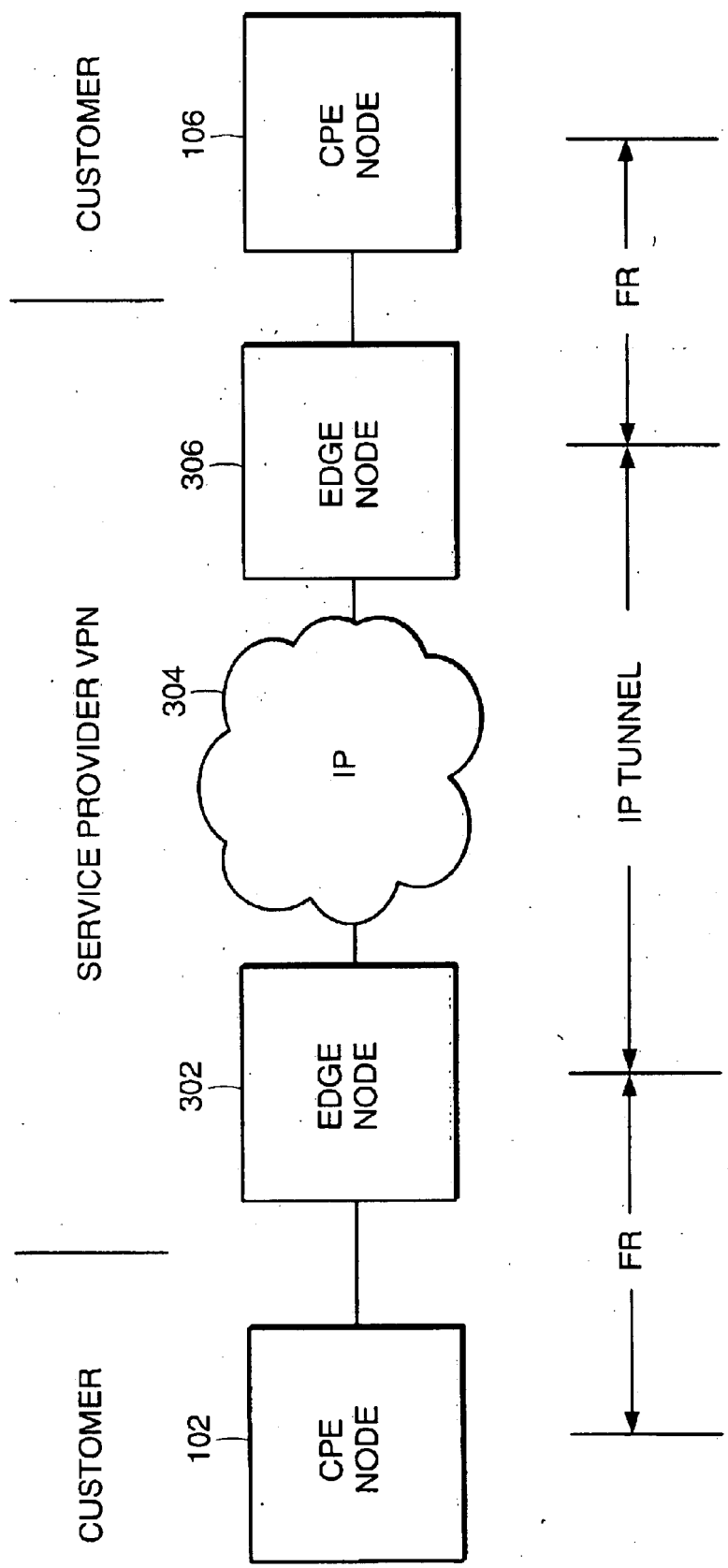
FIG. 3 is a network diagram showing an exemplary communication network in which CPE nodes are interconnected over an Internet Protocol virtual private network in accordance with an embodiment of the present invention.
Figure 4:
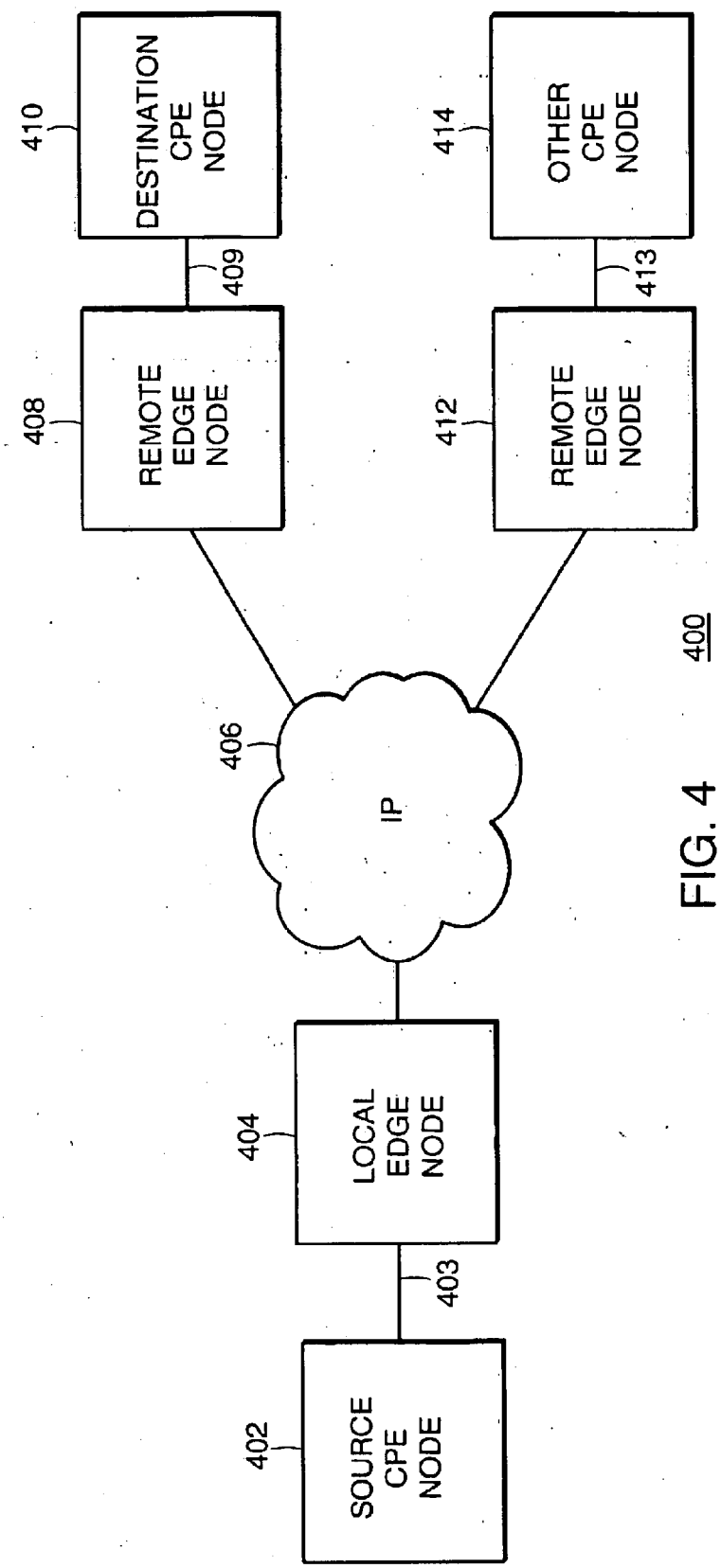
FIG. 4 is a network diagram showing an exemplary communication network identifying various devices relative to their particular roles in a transaction between a source CPE node and a destination CPE node in accordance with an embodiment of the present invention.

In order to present various embodiments of the invention, it is convenient to label various devices in the communication network relative to their particular roles in a transaction between a source CPE node and a destination CPE node. FIG. 4 shows an exemplary communication network 400 having a source CPE node (402), a destination CPE node (410), and another CPE node (414) that are interconnected over a VPN that includes three (3) edge nodes (404, 408, 412). The three (3) edge nodes (404, 408, 412) are interconnected over an IP backbone network (406). For convenience, the edge node that supports the source CPE node (402) is referred to as the local edge node (404), while the other edge nodes are referred to as remote edge nodes (408, 412). The source CPE node (402) is supported by the local edge node (404) via a Frame Relay interface (403). The destination CPE node (410) is supported by the remote edge node (408) via a Frame Relay interface (409). The other CPE node (414) is supported by the remote edge node (412) via a Frame Relay interface (413). The IP backbone network (406) may support multiple VPNs.

Each CPE node is configured with one IP address per Frame Relay interface. All CPE nodes in the VPN are configured with IP addresses from the same subnet. For the sake of simplicity, it is assumed that there are no Frame Relay switches between a CPE node and its corresponding edge node, so that the edge node provides all LMI messages. It is also assumed that each edge node is able to identify the VPNs that it supports (for example, through edge node configuration), and that each edge node is able to discover and communicate with the other edge nodes that serve a common VPN.

Each edge node signals a spare Frame Relay virtual circuit (DLCI) on each Frame Relay interface. Thus, the local edge node (404) signals a spare Frame Relay virtual circuit (DLCI) to the source CPE node (402) on the Frame Relay interface (403), the remote edge node (408) signals a spare Frame Relay virtual circuit (DLCI) to the destination CPE node (410) on the Frame Relay interface (409), and the remote edge node (412) signals a spare Frame Relay virtual circuit (DLCI) to the other CPE node (414) on the Frame Relay interface (413).

In a typical embodiment of the invention, each CPE node is configured to send an Inverse ARP request upon detecting the spare Frame Relay virtual circuit (DLCI) signaled by corresponding edge node over the Frame Relay interface. Thus, assuming all CPE nodes are configured to use Inverse ARP, the source CPE node (402) sends an Inverse ARP request to the local edge node (404) upon detecting the spare Frame Relay virtual circuit (DLCI) signaled by the local edge node (404) on the Frame Relay interface (403), the destination CPE node (410) sends an Inverse ARP request to the remote edge node (408) upon detecting the spare Frame Relay virtual circuit (DLCI) signaled by the remote edge node (408) on the Frame Relay interface (409), and the other CPE node (414) sends an Inverse ARP request to the remote edge node (412) upon detecting the spare Frame Relay virtual circuit (DLCI) signaled by the remote edge node (412) on the Frame Relay interface (413).

The CPE node sends the Inverse ARP request in order to obtain the IP address of the edge node so that the Frame Relay virtual circuit (DLCI) can be mapped to the corresponding IP address. In accordance with the Inverse ARP specification, the CPE node includes its IP address in the Inverse ARP request. Because the edge node does not want to bind the spare Frame Relay virtual circuit (DLCI) to the CPE node until the CPE node requires a connection over the VPN, the edge node does not send an Inverse ARP reply to the CPE node. This prevents the CPE node from obtaining the IP address of the edge node and installing an ARP table entry mapping the spare Frame Relay virtual circuit (DLCI) to the edge node IP address. However, the edge node preferably stores the IP address of the CPE node for future reference.

When the source CPE node (402) needs to send a broadcast protocol message, the source CPE node (402) sends the broadcast protocol message over all CPE node interfaces, including the spare Frame Relay virtual circuit (DLCI) signaled by the local edge node (404) on the Frame Relay interface (403). The local edge node (404) receives the broadcast protocol message from the source CPE node (402) over the spare Frame Relay virtual circuit (DLCI), and forwards the broadcast protocol message to all remote edge nodes in the same VPN, including the remote edge node (408) and the remote edge node (412). Each remote edge node forwards the broadcast protocol message over all remote edge node interfaces. Thus, the remote edge node (408) forwards the broadcast protocol message to the destination CPE node (410) over the spare Frame Relay virtual circuit (DLCI) signaled by the remote edge node (408) on the Frame Relay interface (409), and the remote edge node (412) forwards the broadcast protocol message to the other CPE node (414) over the spare Frame Relay virtual circuit (DLCI) signaled by the remote edge node (412) on the Frame Relay interface (413).

In order for the source CPE node (402) to send a unicast protocol message over the VPN, a communication path must be established between the source CPE node (402) and the destination CPE node (410). In particular, a local Frame Relay virtual circuit must be established between the source CPE node (402) and the local edge node (404), an IP tunnel must be established between the local edge node (404) and the remote edge node (408) over the IP backbone network (406), and a remote Frame Relay virtual circuit must be established between the remote edge node (408) and the destination CPE node (410). Also, the local edge node (404) must map the local Frame Relay virtual circuit (DLCI) to the IP tunnel, and the remote edge node (408) must map the remote Frame Relay virtual circuit to the IP tunnel. Each edge node maintains a forwarding table mapping each IP tunnel to a corresponding Frame Relay virtual circuit (DLCI). Once the communication path is established, protocol messages sent by the source CPE node (402) over the local Frame Relay virtual circuit are forwarded by the local edge node (404) to the remote edge node (408) over the IP tunnel and by the remote edge node (408) to the destination CPE node (410) over the remote Frame Relay virtual circuit, and conversely protocol messages sent by the destination CPE node (410) over the remote Frame Relay virtual circuit are forwarded by the remote edge node (408) to the local edge node (404) over the IP tunnel and by the local edge node (404) to the source CPE node (402) over the local Frame Relay virtual circuit.

Thus, when the source CPE node (402) needs to send a unicast protocol message (either as the source for the unicast protocol message as an intermediary that routes protocol messages), the source CPE node (402) first determines a next hop device for the unicast protocol message based upon the destination address in the unicast protocol message. The next hop device is a remote CPE node to which the unicast protocol message must be forwarded in order to reach its ultimate destination. In this example, the next hop device is the destination CPE node (410). The ultimate destination for the unicast protocol message, as indicated by the destination address in the unicast protocol message, may be the destination CPE node (410), although the destination for the unicast protocol message is typically another device that is accessed through the destination CPE node (410). The source CPE node (402) uses a routing table to obtain a next hop address for the unicast protocol message, specifically by searching for a routing entry corresponding to the destination address in the routing table.

Upon obtaining the next hop address for the unicast protocol message, the source CPE node (402) determines whether there is a communication path to the destination CPE node (410) over the VPN. The source CPE node (402) uses an ARP table to determine whether there is a communication path to the destination CPE node (410), specifically by searching the ARP table for a local Frame Relay virtual circuit (DLCI) corresponding to the next hop address.

Assuming the source CPE node (402) does not find the local Frame Relay virtual circuit (DLCI) for the next hop address in the ARP table, which indicates that there is no communication path to the destination CPE node (410), then the source CPE node (402) establishes the communication path to the destination CPE node (410). Specifically, the source CPE node (402) sends an ARP request to the local edge node (404) over a spare Frame Relay virtual circuit that the local edge node (404) signals using the LMI. The ARP request identifies the source CPE node (402) as the initiator of the ARP request and identifies the destination CPE node (410) as the target of the ARP request, specifically by including an initiator IP address equal to the IP address of the source CPE node (402) and a target IP address equal to the IP address of the destination CPE node (410) (i.e., the next hop address). The ARP request is used by the source CPE node (402) to obtain a local Frame Relay virtual circuit (DLCI) corresponding to the destination IP address.

Upon receiving the ARP request from the source CPE node (402), the local edge node (404) forwards the ARP request to all remote edge nodes in the VPN. Therefore, the local edge node (404) forwards the ARP request to the remote edge node (408), the remote edge node (412), and possibly to other remote edge nodes in the VPN.

Each remote edge node that receives the ARP request from the local edge node (404) forwards the ARP request to each CPE node that it supports over a spare Frame Relay virtual circuit (DLCI) that it signals using the LMI. Therefore, the remote edge node (408) forwards the ARP request to the destination CPE node (410) over a spare Frame Relay virtual circuit (DLCI) on the Frame Relay interface (409), and the remote edge node (412) forwards the ARP request to the other CPE node (414) over a spare Frame Relay virtual circuit (DLCI) on the Frame Relay interface (413).

Each CPE node that receives the ARP request determines whether it is the target CPE node identified in the ARP request, specifically by comparing its IP address to the target IP address in the ARP request. Only the target CPE node sends an ARP reply in response to the ARP request. Therefore, in this example, the destination CPE node (410) sends an ARP reply in response to the ARP request, while the other CPE node (414) does not send an ARP reply in response to the ARP request.

When the remote edge node (408) receives the ARP reply from the destination CPE node (410), the remote edge node (408) forwards the ARP reply to the local edge node (404). The remote edge node (408) also reserves the remote Frame Relay virtual circuit (DLCI) for the communication path between the destination CPE node (410) and the source CPE node (402). The remote edge node (408) may also signal a new Frame Relay virtual circuit (DLCI) to the destination CPE node (410) over the Frame Relay interface (409).

When the local edge node (404) receives the ARP reply from the remote edge node (408), the local edge node (404) reserves the local Frame Relay virtual circuit (DLCI) for the communication path between the source CPE node (402) and the destination CPE node (410). The local edge node (404) sends an ARP reply to the source CPE node (402) including the DLCI of the reserved Frame Relay virtual circuit, and establishes an IP tunnel to the remote edge node (408). The local edge node (404) installs a forwarding entry in its forwarding table mapping the local Frame Relay virtual circuit (DLCI) to the IP tunnel, while the remote edge node (408) installs a forwarding entry in its forwarding table mapping the remote Frame Relay virtual circuit (DLCI) to the IP tunnel.

When the source CPE node (402) receives the ARP reply from the local edge node (404), the source CPE node (402) installs an ARP table entry mapping the next hop address to the local Frame Relay virtual circuit (DLCI). The source CPE node (402) then sends the unicast protocol message to the local edge node (404) over the local Frame Relay virtual circuit using the DLCI corresponding to the local Frame Relay virtual circuit.

Upon receiving the unicast protocol message from the source CPE node (402) over the local Frame Relay virtual circuit, the local edge node (404) searches its forwarding table to determine the IP tunnel corresponding to the DLCI, and forwards the unicast protocol message to the remote edge node (408) over the IP tunnel.

Upon receiving the unicast protocol message from the local edge node (404) over the IP tunnel, the remote edge node (408) searches its forwarding table to determine the remote Frame Relay virtual circuit (DLCI) corresponding to the IP tunnel, and forwards the unicast protocol message to the destination CPE node (410) over the remote Frame Relay virtual circuit using the DLCI corresponding to the remote Frame Relay virtual circuit.

Thereafter, whenever the source CPE node (402) wants to send a unicast protocol message to a device that is supported by the destination CPE node (410), the source CPE node (402) uses the routing table to determine the next hop address associated with the unicast protocol message, searches its ARP table to find the local Frame Relay virtual circuit (DLCI) corresponding to the next hop address, and, upon finding the local Frame Relay virtual circuit (DLCI) corresponding to the next hop address, sends the unicast protocol message to the local edge node (404) over the local Frame Relay virtual circuit using the DLCI corresponding to the local Frame Relay virtual circuit.

In the course of establishing the communication path between the source CPE node (402) and the destination CPE node (410) as described above, each remote edge node forwards the ARP request to each CPE node that it supports. In addition to deciding whether to respond to the ARP request, each CPE node that receives the ARP request typically also adds an ARP table entry mapping the initiator IP address, which, in this example, is the IP address of the source CPE node (402), to the Frame Relay virtual circuit (DLCI) signaled by the corresponding remote edge node. Therefore, the destination CPE node (410) adds an ARP table entry mapping the IP address of the source CPE node (402) to the spare Frame Relay virtual circuit (DLCI) signaled by the remote edge node (408) on the Frame Relay interface (409), while the other CPE node (414) adds an ARP table entry mapping the IP address of the source CPE node (402) to the spare Frame Relay virtual circuit (DLCI) signaled by the remote edge node (412) on the Frame Relay interface (413).

The fact that the destination CPE node (410) adds an ARP table entry mapping the IP address of the source CPE node (402) to the spare Frame Relay virtual circuit (DLCI) signaled by the remote edge node (408) on the Frame Relay interface (409) is not a problem, since the remote edge node (408) ultimately maps the Frame Relay virtual circuit (DLCI) to the IP tunnel that was established between the local edge node (404) and the remote edge node (408), and the IP tunnel supports duplex traffic between the source CPE node (402) and the destination CPE node (410). Therefore, when the destination CPE node (410) wants to send a unicast protocol message to a device supported by the source CPE node (402), the destination CPE node (410) obtains the Frame Relay virtual circuit (DLCI) from its ARP table, and sends the unicast protocol message to the remote edge node (408) over the Frame Relay virtual circuit using the DLCI. Upon receiving the unicast protocol message from the destination CPE node (410), the remote edge node (408) searches its forwarding table to determine the IP tunnel corresponding to the Frame Relay virtual circuit (DLCI), and forwards the unicast protocol message to the local edge node (404) over the IP tunnel.

However, the fact that the other CPE node (414) installs an ARP table entry mapping the IP address of the source CPE node (402) to the spare Frame Relay virtual circuit (DLCI) signaled by the remote edge node (412) on the Frame Relay interface (413) is problematic, since there is no actual communication path between the source CPE node (402) and the other CPE node (414). The remote edge node (412) does not yet map the spare Frame Relay virtual circuit (DLCI) to a particular IP tunnel. Therefore, when the other CPE node (414) wants to send a unicast protocol message to a device supported by the source CPE node (402), the other CPE node (414) obtains the Frame Relay virtual circuit (DLCI) from its ARP table, and sends the unicast protocol message to the remote edge node (412) over the Frame Relay virtual circuit using the DLCI. Upon receiving the unicast protocol message from the other CPE node (414), the remote edge node (412) searches its forwarding table to determine the IP tunnel corresponding to the Frame Relay virtual circuit (DLCI), and drops the unicast protocol message upon determining that there is no IP tunnel corresponding to the Frame Relay virtual circuit (DLCI).

In one embodiment of the invention, the remote edge node (412) establishes a communication path between the other CPE node (414) and the source CPE node (402) upon receiving the ARP request and determining that the other CPE node (414) is not the target CPE node. If the remote edge node (412) had obtained the IP address of the other CPE node (414) prior to receiving the ARP request, for example, by receiving the IP address in an Inverse ARP request sent by the other CPE node (414) over the spare Frame Relay virtual circuit (DLCI) signaled by the remote edge node (412) on the Frame Relay interface (413), then the remote edge node (412) is able to determine that the other CPE node (414) is not the target CPE node simply by comparing the target IP address from the ARP request to the IP address of the other CPE node (414). Otherwise, the remote edge node (412) determines that the other CPE node (414) is not the intended destination CPE node by failing to receive an ARP reply from the other CPE node (414) after forwarding the ARP request to the other CPE node (414) over the spare Frame Relay virtual circuit signaled by the remote edge node (412) on the Frame Relay interface (413), in which case the remote edge node (412) obtains the IP address of the other CPE node (414), for example, by sending an ARP request to the other CPE node (414) over the spare Frame Relay virtual circuit signaled by the remote edge node (412) on the Frame Relay interface (413) and receiving an ARP reply from the other CPE node (414) including the IP address of the other CPE node (414).

After determining that other CPE node (414) is not the intended destination CPE node and obtaining the IP address of the other CPE node (414), if necessary, the remote edge node (412) sends an ARP request to the local edge node (404) over the VPN including, as the initiator IP address, the IP address of the other CPE node (414), and, as the target IP address, the IP address of the source CPE node (402).

Upon receiving the ARP request from the remote edge node (412), the local edge node (404) signals a new Frame Relay virtual circuit (DLCI) to the source CPE node (402) on the Frame Relay interface (403), and forwards the ARP request to the source CPE node (402) over the new Frame Relay virtual circuit (DLCI).

Upon receiving the ARP request from the local edge node (404), the source CPE node (402) installs an ARP table entry mapping the IP address of the other CPE node (414), which is conveyed as the initiator IP address from the ARP request, to the new Frame Relay virtual circuit (DLCI) signaled by the local edge node (404) on the Frame Relay interface (403), and sends an ARP reply to the local edge node (404) over the new Frame Relay virtual circuit.

When the local edge node (404) receives the ARP reply from the source CPE node (402), the local edge node (404) forwards the ARP reply to the remote edge node (412). The local edge node (404) also reserved the new Frame Relay virtual circuit (DLCI) for the communication path between the source CPE node (402) and the other CPE node (414).

When the remote edge node (412) receives the ARP reply from the local edge node (404), the remote edge node (412) reserves the spare Frame Relay virtual circuit (DLCI) for communication between the other CPE node (414) and the source CPE node (402). The remote edge node (412) then establishes an IP tunnel to the local edge node (404).

The remote edge node (412) installs a forwarding entry in its forwarding table mapping the reserved Frame Relay virtual circuit (DLCI) to the IP tunnel, while the local edge node (404) installs a forwarding entry in its forwarding table mapping the new Frame Relay virtual circuit (DLCI) to the IP tunnel.

In an alternative embodiment, the remote edge node (412) establishes the communication path between the other CPE node (414) and the source CPE node (402) upon receiving a unicast protocol message sent by the other CPE node (414) to the source CPE node (402). In this case, the remote edge node (412) reserves the spare Frame Relay virtual circuit (DLCI) for the communication path between the other CPE node (414) and the source CPE node (402) upon receiving the ARP request and determining that the other CPE node (414) is not the target CPE node, but does not establish the communication path between the other CPE node (414) and the source CPE node (412) at that time. Instead, when the remote edge node (412) receives the unicast protocol message from the other CPE node (414), the remote edge node (412) obtains the IP address of the other CPE node (414) from the unicast protocol message, if necessary, and establishes the communication path between the other CPE node (414) and the source CPE node (402) substantially as described above. After establishing the communication path between the other CPE node (414) and the source CPE node (402), the remote edge node (412) forwards the unicast protocol message to the source CPE node (402).

Figure 5:
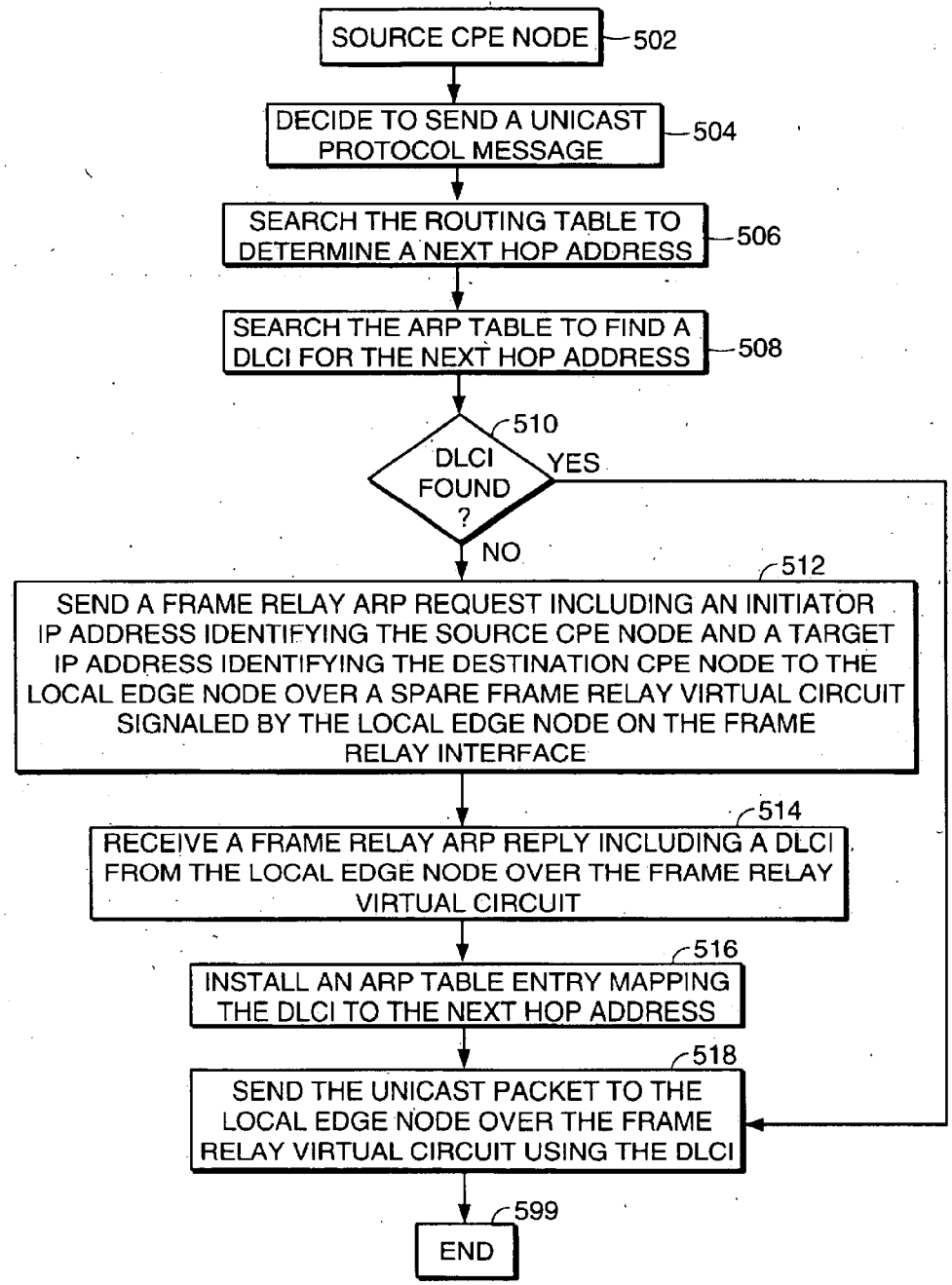
FIG. 5 is a logic flow diagram showing exemplary logic for sending a unicast packet by a source CPE node in accordance with an embodiment of the present invention.

FIG. 5 is a logic flow diagram showing exemplary logic 500 for sending a unicast packet by the source CPE node (402) in accordance with an embodiment of the present invention. Beginning at step 502, and upon deciding to send a unicast protocol message, in step 504, the logic searches the routing table to determine a next hop address for the unicast protocol message based upon the destination address in the unicast protocol message, in step 506. The logic then searches the ARP table to find a Frame Relay virtual circuit (DLCI) corresponding to the next hop address, in step 508. If the logic finds a corresponding Frame Relay virtual circuit (DLCI) for the next hop address in the ARP table (YES in step 510), then the logic proceeds to send the unicast packet to the local edge node (404) over the Frame Relay virtual circuit using the DLCI, in step 518. However, if the logic does not find a corresponding Frame Relay virtual circuit (DLCI) for the next hop address in the ARP table (NO in step 510), then the logic proceeds to send a Frame Relay ARP request including an initiator IP address identifying the source CPE node (402) and a target IP address identifying the destination CPE node (410) to the local edge node (404) over a spare Frame Relay virtual circuit signaled by the local edge node (404) on the Frame Relay interface (403), in step 512, and waits for an ARP reply. Upon receiving the ARP reply including a DLCI from the local edge node (404) over the Frame Relay virtual circuit, in step 514, the logic installs an ARP table entry mapping the DLCI to the next hop address, in step 516, and sends the unicast packet to the local edge node (404) over the Frame Relay virtual circuit using the DLCI, in step 518. The logic 500 terminates in step 599.

Figure 6:
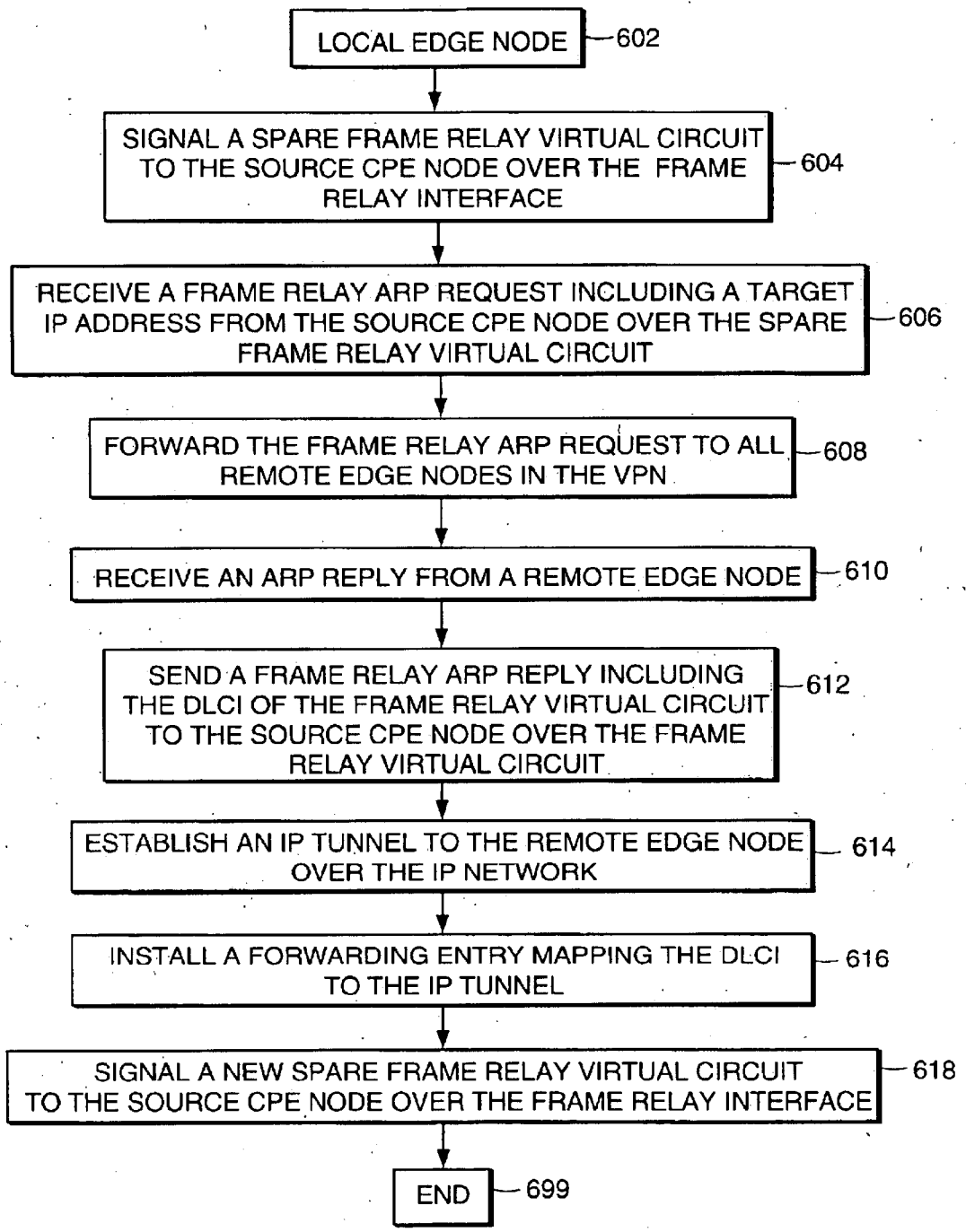
FIG. 6 is a logic flow diagram showing exemplary logic for dynamically allocating a frame relay virtual circuit for an IP tunnel by a local edge node in accordance with an embodiment of the present invention.

FIG. 6 is a logic flow diagram showing exemplary logic 600 for dynamically allocating a frame relay virtual circuit for an IP tunnel by the local edge node (404) in accordance with an embodiment of the present invention. Beginning at step 602, the logic signals a spare Frame Relay virtual circuit to the source CPE node (402) over the Frame Relay interface (403), in step 604. Upon receiving a Frame Relay ARP request including a target IP address from the source CPE node (402) over the spare Frame Relay virtual circuit, in step 606, the logic forwards the Frame Relay ARP request to all remote edge nodes in the VPN, including the remote edge node (408) and the remote edge node (412), in step 608, and waits for an ARP reply from a remote edge node which, in this example, is the remote edge node (408). Upon receiving an ARP reply from the remote edge node (408), in step 610, the logic sends a Frame Relay ARP reply including the DLCI of the Frame Relay virtual circuit to the source CPE node (402) over the Frame Relay virtual circuit, in step 612. The logic then establishes an IP tunnel to the remote edge node (408) over the IP network (406), in step 614, and installs a forwarding entry in the forwarding table mapping the DLCI to the IP tunnel, in step 616. Having reserved the Frame Relay virtual circuit for the IP tunnel, the logic preferably signals a new spare Frame Relay virtual circuit to the source CPE node (402) over the Frame Relay interface (403), in step 618. The logic 600 terminates in step 699.

Figure 7:
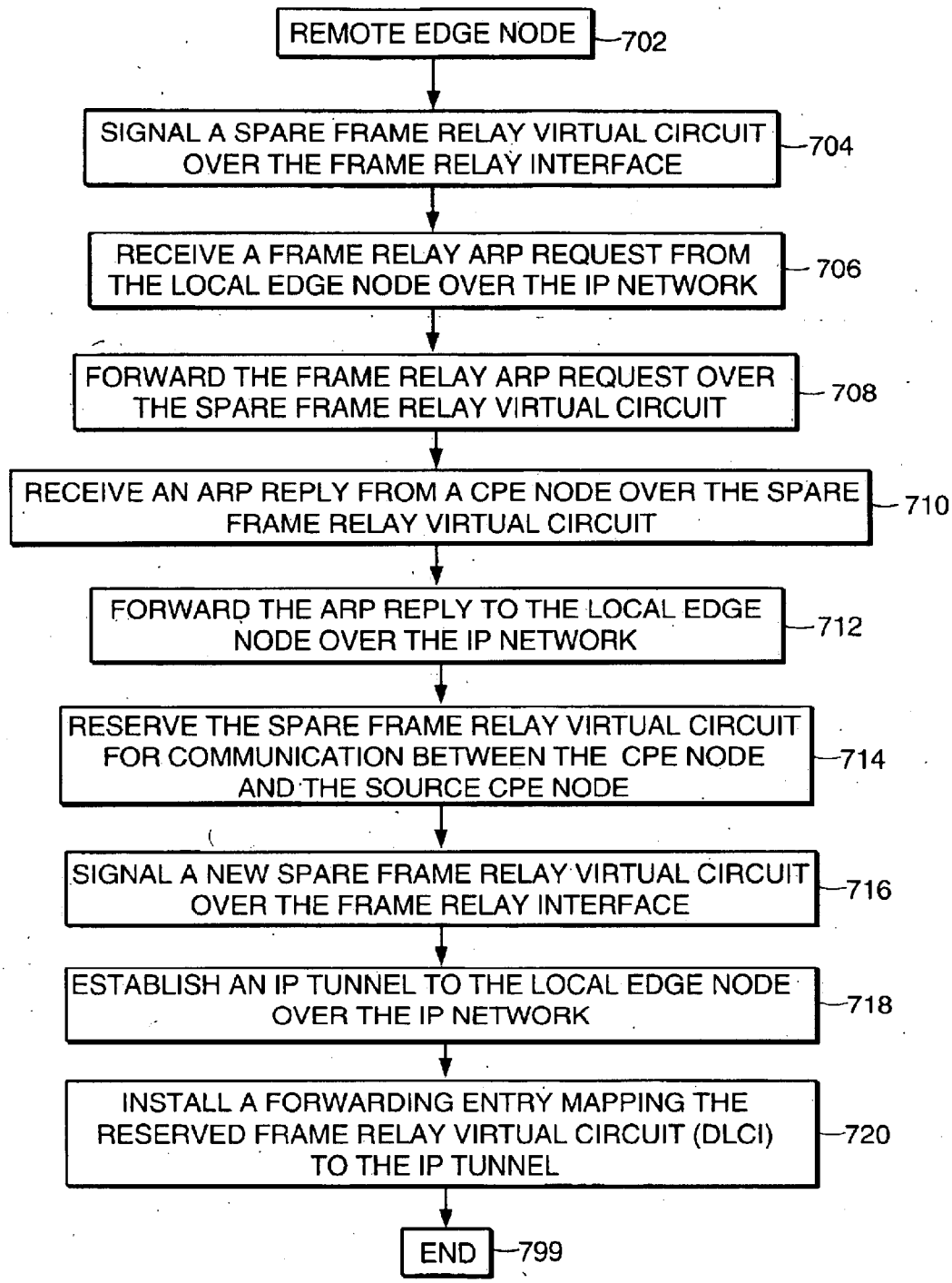
FIG. 7 is a logic flow diagram showing exemplary logic for dynamically allocating a frame relay virtual circuit for an IP tunnel by a remote edge node in accordance with an embodiment of the present invention.

FIG. 7 is a logic flow diagram showing exemplary logic 700 for dynamically allocating a frame relay virtual circuit for an IP tunnel by the remote edge node (408) in accordance with an embodiment of the present invention. Beginning at step 702, the logic signals a spare Frame Relay virtual circuit over the Frame Relay interface (409), in step 704. Upon receiving a Frame Relay ARP request from the local edge node (404) over the IP network (406), in step 706, the logic forwards the Frame Relay ARP request over the spare Frame Relay virtual circuit, in step 708, and waits for an ARP reply from a CPE node which, in this example, is the destination CPE node (410). Upon receiving an ARP reply from the destination CPE node (410) over the spare Frame Relay virtual circuit, in step 710, the logic forwards the ARP reply to the local edge node (404) over the IP network (406), in step 712. The logic also reserves the spare Frame Relay virtual circuit for communication between the destination CPE node (410) and the source CPE node (402), in step 714, and signals a new spare Frame Relay virtual circuit over the Frame Relay interface (409), in step 716. Thereafter, the logic establishes an IP tunnel to the local edge node (404) over the IP network (406), in step 718, at which time the logic installs a forwarding entry in the forwarding table mapping the reserved Frame Relay virtual circuit (DLCI) to the IP tunnel, in step 720. The logic 700 terminates in step 799.

Figure 8:
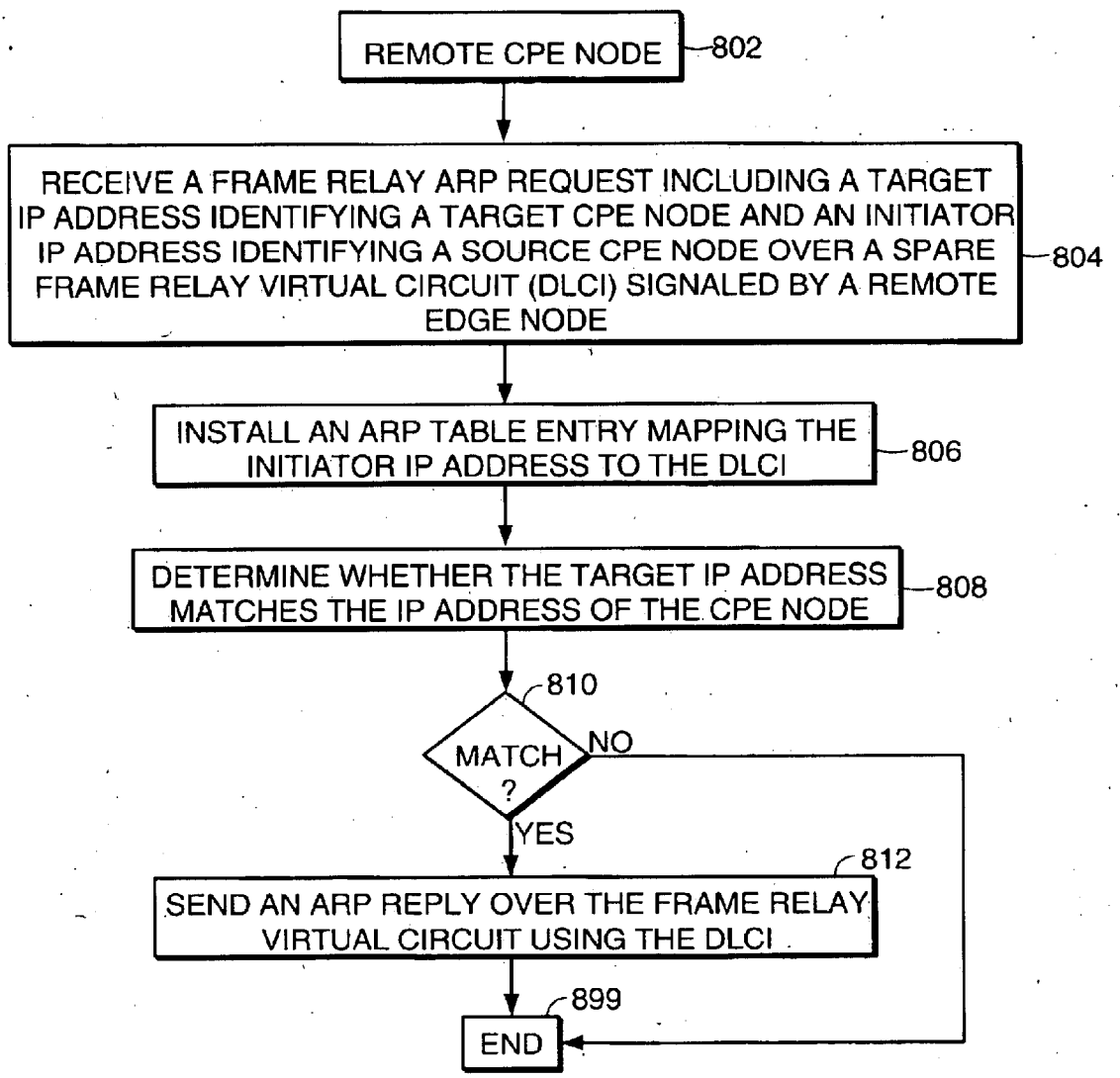
FIG. 8 is a logic flow diagram showing exemplary logic for processing an ARP request by a destination CPE node in accordance with an embodiment of the present invention.

FIG. 8 is a logic flow diagram showing exemplary logic 800 for processing an ARP request by a remote CPE node, such as the destination CPE node (410) and the other CPE node (414), in accordance with an embodiment of the present invention. Beginning at step 802, and upon receiving a Frame Relay ARP request including a target IP address identifying a target CPE node and an initiator IP address identifying the source CPE node (402) over a spare Frame Relay virtual circuit (DLCI) signaled by the remote edge node (408, 412), the logic installs an ARP table entry mapping the initiator IP address to the DLCI, in step 806. The logic then determines whether the target IP address from the Frame Relay ARP request matches the IP address of the CPE node, in step 808. If the target IP address from the Frame Relay ARP request matches the IP address of the CPE node (YES in step 810), then the logic sends an ARP reply over the Frame Relay virtual circuit using the DLCI, in step 812. If the target IP address from the Frame Relay ARP request does not match the IP address of the CPE node (NO in step 810), then the logic does not send an ARP reply. The logic 800 terminates in step 899.

Figure 9:
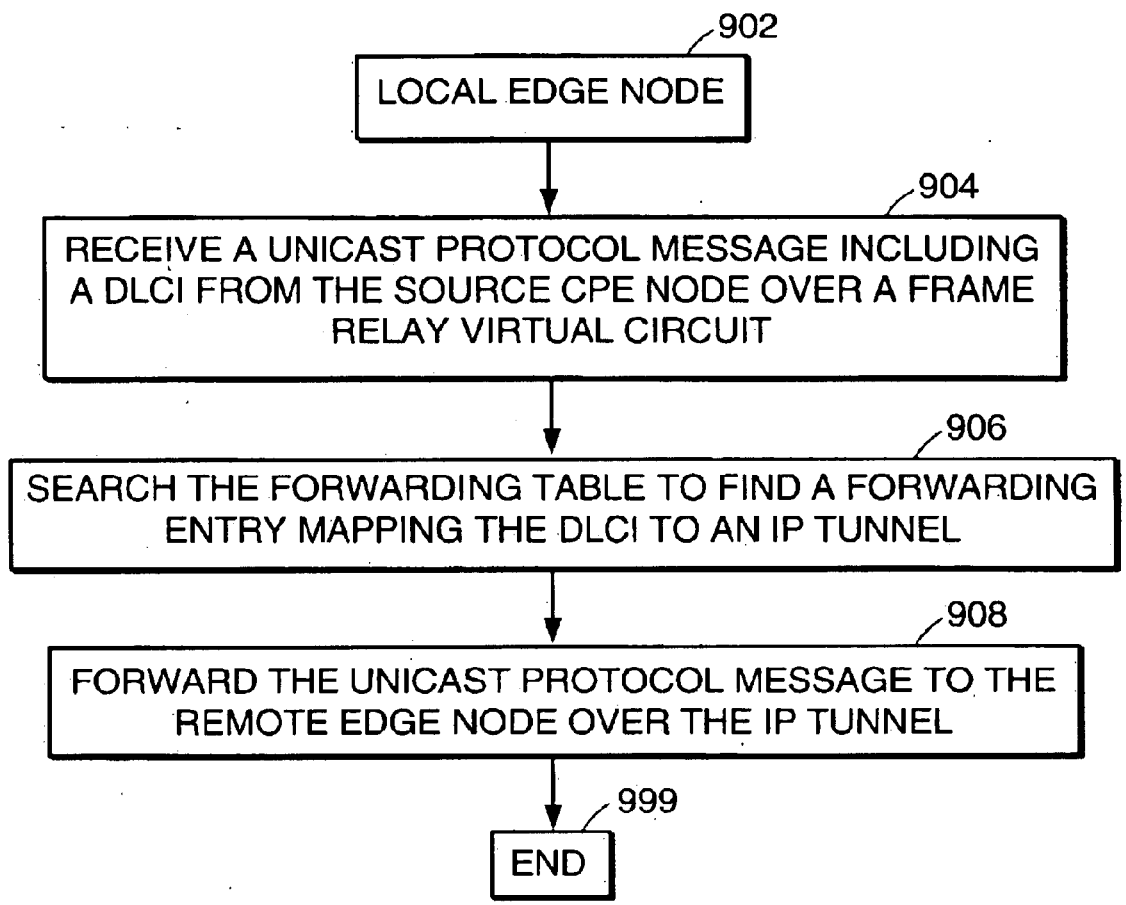
FIG. 9 is a logic flow diagram showing exemplary logic for forwarding a unicast protocol message by a local edge node in accordance with an embodiment of the present invention.

FIG. 9 is a logic flow diagram showing exemplary logic for forwarding a unicast protocol message by the local edge node (404) in accordance with an embodiment of the present invention. Beginning at step 902, and upon receiving a unicast protocol message including a DLCI from the source CPe node (402) over a Frame Relay virtual circuit, in step 904, the logic searches the forwarding table to find a forwarding entry mapping the DLCI to an IP tunnel, in step 906. The logic then forwards the unicast protocol message to the remote edge node over the IP tunnel, in step 908. The logic 900 terminates in step 999.

Figure 10:
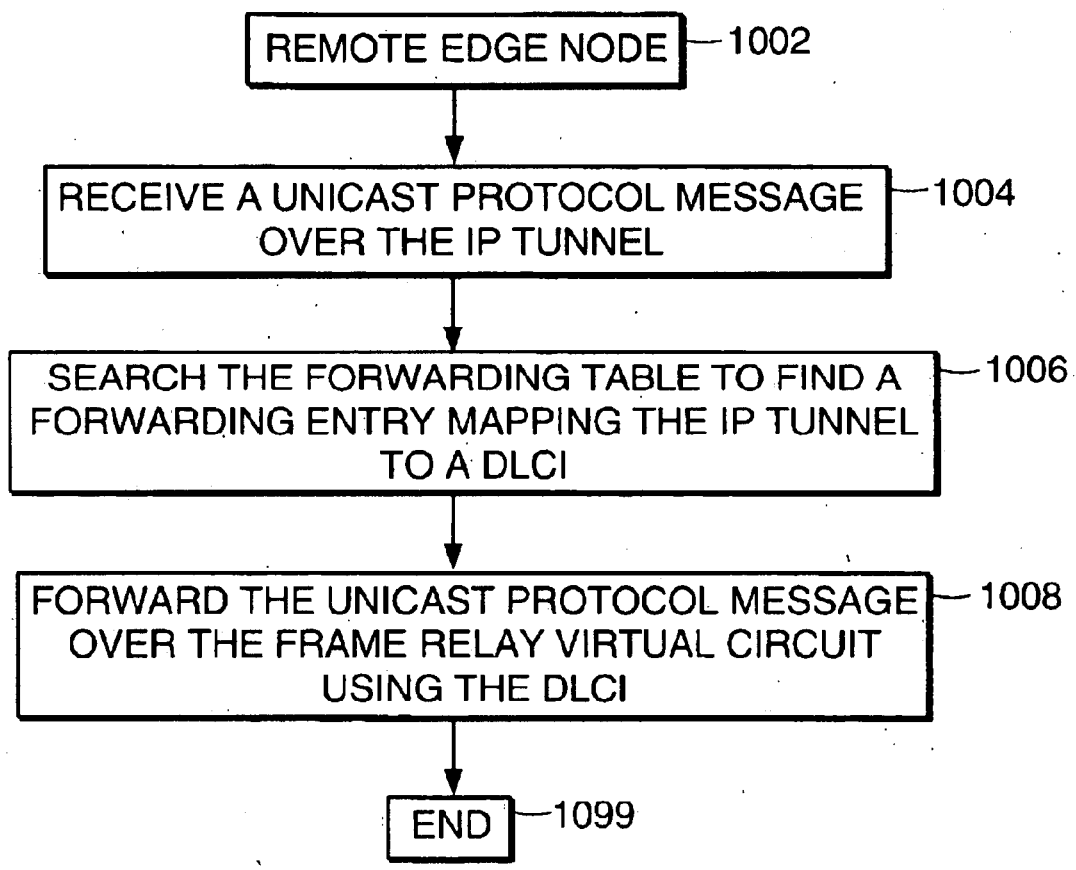
FIG. 10 is a logic flow diagram showing exemplary logic for forwarding a unicast protocol message by a remote edge node in accordance with an embodiment of the present invention.

FIG. 10 is a logic flow diagram showing exemplary logic 1000 for forwarding a unicast protocol message by the remote edge node (408) in accordance with an embodiment of the present invention. Beginning at step 1002, and upon receiving a unicast protocol message from the local edge node (404) over the IP tunnel, in step 1004, the logic searches the forwarding table for a forwarding entry mapping the IP tunnel to a Frame Relay virtual circuit (DLCI), in step 1006. The logic then forwards the unicast protocol message to the destination CPE node (410) over the Frame Relay virtual circuit using the DLCI, in step 1008. The logic 1000 terminates in step 1099.

Figure 11:
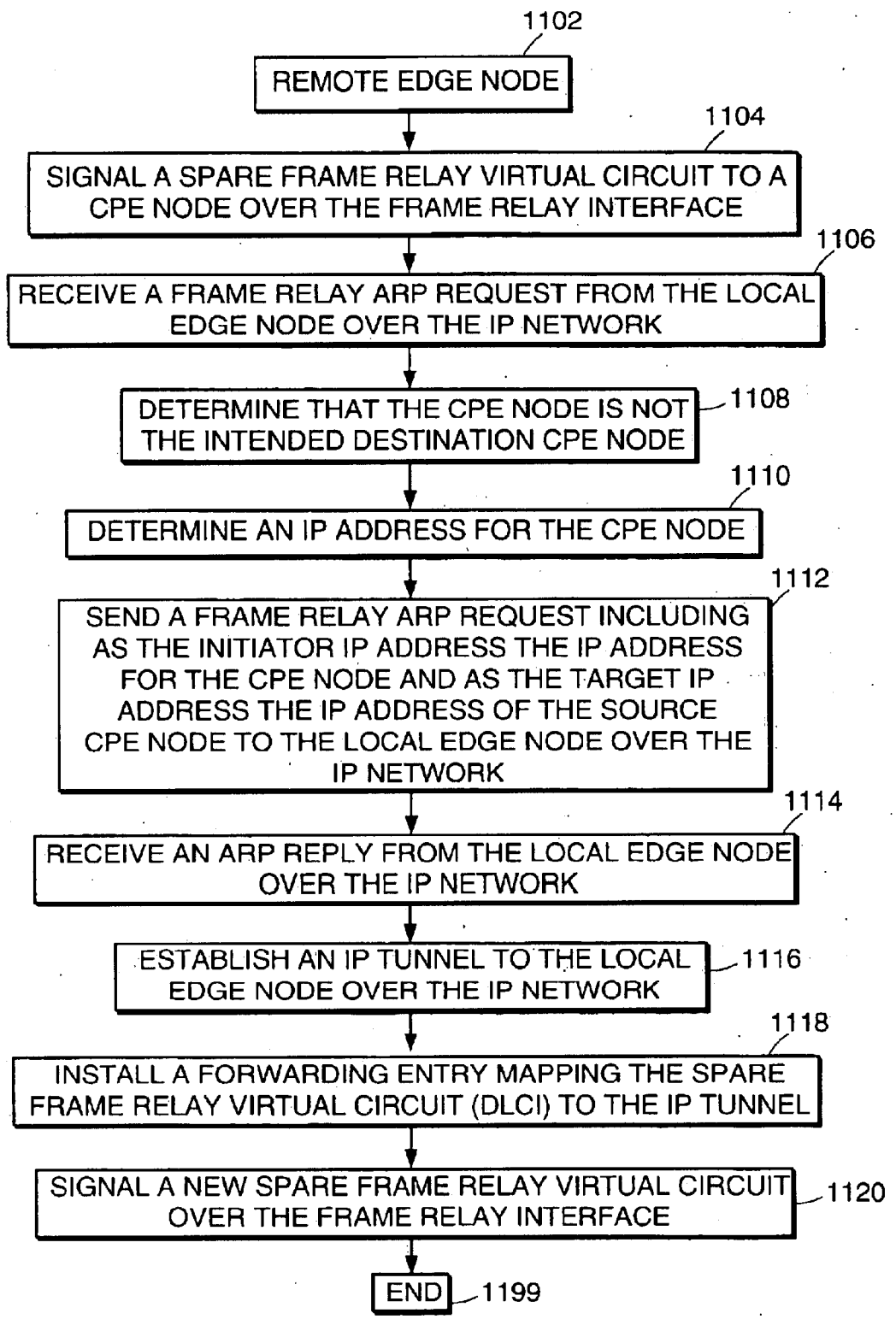
FIG. 11 is a logic flow diagram showing exemplary logic for dynamically allocating a frame relay virtual circuit for an IP tunnel by a remote edge node in accordance with an embodiment of the present invention.

FIG. 11 is a logic flow diagram showing exemplary logic 1100 for establishing a communication path between the other CPE node (414) and the source CPE node (402) by the remote edge node (412) in accordance with an embodiment of the present invention. Beginning at step 1102, the logic signals a spare Frame Relay virtual circuit to the other CPE node (414) over the Frame Relay interface (413), in step 1104. Upon receiving a Frame Relay ARP request from the local edge node (404) over the IP network (406), in step 1106, and determining that the other CPE node (414) is not the intended destination CPE node, in step 1108, the logic determines an IP address for the other CPE node, in step 1110, for example, by receiving an Inverse ARP request including the IP address from the other CPE node (414) or by sending an ARP request to the other CPE node (414). After determining the IP address for the other CPE node (414), in step 1110, the logic sends a Frame Relay ARP request including as the initiator IP address the IP address of the other CPE node (414) and as the target IP address the IP address of the source CPE node (402) to the local edge node (404) over the IP network (406), in step 1112, and waits for an ARP reply. Upon receiving an ARP reply from the local edge node (404) over the IP network (406), in step 1114, the logic establishes an IP tunnel to the local edge node (404) over the IP network (406), in step 1116, and installs a forwarding entry in the forwarding table mapping the spare Frame Relay virtual circuit (DLCI) to the IP tunnel, in step 1118. Having reserved the Frame Relay virtual circuit for the IP tunnel, the logic preferably signals a new spare Frame Relay virtual circuit to the other CPE node (414) over the Frame Relay interface (413), in step 1120. The logic 1100 terminates in step 1199.

In a preferred embodiment of the present invention, predominantly all of the described logic is implemented as a set of computer program instructions that are stored in a computer readable medium and executed by an embedded microprocessor system within a network node. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

As described above, the CPE nodes are preferably coupled to the edge nodes via Frame Relay interfaces. The edge nodes dynamically allocate Frame Relay virtual circuits, and in particular, Frame Relay permanent virtual circuits (PVCs), based upon ARP requests, and map the DLCI for each Frame Relay virtual circuit to a corresponding IP tunnel for forwarding unicast protocol messages across the VPN.

However, the present invention is not limited to dynamically allocating Frame Relay virtual circuits. The present invention may be used in other types of networks to dynamically allocate other types of virtual circuits and map a virtual circuit identifier for each virtual circuit to a corresponding IP tunnel for forwarding unicast protocol messages across the VPN. For example, in an alternative embodiment of the present invention, the CPE nodes may be coupled to the edge nodes via X.25 interfaces, in which case various mechanisms of the present invention may be used to dynamically allocate X.25 virtual circuits based upon ARP requests and map the virtual channel number for each X.25 virtual circuit to a corresponding IP tunnel for forwarding unicast protocol messages across the VPN.

Thus, the present invention may be embodied as a method for allocating virtual circuits by an edge node in a communication network. The edge node supports a device over an interface. The method involves receiving an address resolution request identifying a source device and a destination device, allocating a virtual circuit for the supported device, establishing a tunnel for communicating with a second device in the communication network, and associating the virtual circuit with the tunnel. The method may also involve receiving a protocol message from the device over the virtual circuit and forwarding the protocol message over the tunnel. The method may also involve receiving a protocol message from the tunnel and forwarding the protocol message to the device over the virtual circuit. Among other things, the interface may be a frame relay interface, in which case the virtual circuit is typically a frame relay permanent virtual circuit, or an X.25 interface, in which case the virtual circuit is typically an X.25 permanent virtual circuit.

The present invention may also be embodied as an apparatus for allocating virtual circuits in a communication network. The apparatus includes a network interface for supporting a device, an Internet Protocol interface for communicating over an Internet Protocol network, and communication path logic for allocating a virtual circuit for the supported device over the network interface, establishing a tunnel over the Internet Protocol interface for communicating with a second device in the communication network, and mapping the virtual circuit to the tunnel, based upon an address resolution request identifying a source device and a destination device.

The present invention may also be embodied as a computer program product for use particularly in an edge node of a communication network. The computer program product includes, among other things, network interface logic for supporting a device over a network interface, Internet Protocol interface logic for communicating over an Internet Protocol network, and communication path logic programmed to allocate a virtual circuit for the supported device over the network interface, establish a tunnel over the Internet Protocol interface for communicating with a second device in the communication network, and map the virtual circuit to the tunnel, based upon an address resolution request identifying a source device and a destination device.

The present invention may also be embodied as a communication system having at least a source node, a local edge node, a first remote edge node, and a destination node. The source node is coupled to the local edge node over a first interface. The local edge node is coupled to the first remote edge node over an Internet Protocol network. The first remote edge node is coupled to the destination node over a second interface. The source node sends an address resolution request identifying an intended destination node to the local edge node over the first interface. The local edge node receives the address resolution request, forwards the address resolution request over the Internet Protocol network, allocates a first virtual circuit for the source node over the first interface, establishes a first tunnel between the local edge node and the first remote edge node over the Internet Protocol network, and maps the first virtual circuit to the first tunnel. The first remote edge node receives the address resolution request from the local edge node, determines that the destination node is the intended destination node identified by the address resolution request, allocates a second virtual circuit for the destination node over the second interface, establishes the first tunnel between the local edge node and the first remote edge node over the Internet Protocol network, and maps the second virtual circuit to the first tunnel. The communication network may further include a second remote edge node coupled to a third node over a third interface. The second remote edge node receives the address resolution request, determines that the third node is not the intended destination node identified by the address resolution request, determines an Internet Protocol address of the third node, establishes a second tunnel between the second remote edge node and the local edge node, allocates a third virtual circuit for the third node over the third interface, and maps the third virtual circuit to the second tunnel.

The present invention may be embodied in other specific forms without departing from the essence or essential characteristics. The described embodiments are to be considered in all respects only as illustrative and not restrictive.

We claim:

1. A method for allocating virtual circuits by an edge node in a communication network, the edge node supporting a device over an interface, the method comprising:

receiving an address resolution request identifying an initiator and a target;

allocating a virtual circuit for communicating with the supported device, wherein the virtual circuit is identified by a virtual circuit identifier;

subsequent to receiving the address resolution request, establishing a tunnel for communicating with a second device in the communication network; and associating the virtual circuit with the tunnel, wherein said associating comprises maintaining a mapping of the virtual circuit identifier to the tunnel.

2. The method of claim 1, wherein receiving the address resolution request and allocating the virtual circuit for the supported device comprises:

signaling a spare virtual circuit to the supported device;

receiving the address resolution request from the supported device over the spare virtual circuit;

reserving the spare virtual circuit for communicating with the second device.

3. The method of claim 2, further comprising:

sending an address resolution reply to the supported device over the virtual circuit.

4. The method of claim 1, wherein allocating the virtual circuit for the supported device comprises:

signaling a spare virtual circuit to the supported device;

receiving an inverse address resolution request from the supported device over the spare virtual circuit; and reserving the spare virtual circuit for communicating with the second device.

5. The method of claim 1, wherein allocating the virtual circuit for the supported device comprises:

signaling a spare virtual circuit to the supported device;

forwarding the address resolution request to the supported device over the spare virtual circuit;

receiving an address resolution response from the supported device over the spare virtual circuit; and reserving the spare virtual circuit for communicating with the second device.

6. The method of claim 1, wherein allocating the virtual circuit for the supported device comprises:
signaling a spare virtual circuit to the supported device;
receiving an inverse address resolution request from the supported device over the spare virtual circuit; and
reserving the spare virtual circuit for communicating with the second device.

7. The method of claim 1, wherein allocating the virtual circuit for the supported device comprises:
signaling a spare virtual circuit to the supported device;
forwarding the address resolution request to the supported device over the spare virtual circuit; and
reserving the spare virtual circuit for communicating with the second device.

8. The method of claim 1, wherein allocating the virtual circuit for the supported device comprises:
reserving the virtual circuit for communicating with the second device; and
signaling the virtual circuit to the supported device.

9. The method of claim 1, further comprising:
receiving a protocol message from the supported device over the virtual circuit; and
forwarding the protocol message to the second device over the tunnel.

10. The method of claim 1, further comprising:
receiving a protocol message from the second device over the tunnel; and
forwarding the protocol message to the supported device over the virtual circuit.

11. The method of claim 1, further comprising:
receiving a protocol message from the supported device over the virtual circuit, the protocol message including the virtual circuit identifier;
determining the tunnel for communicating with the second device based upon the mapping of the virtual circuit identifier to the tunnel; and
forwarding the protocol message to the second device over the tunnel.

12. The method of claim 1, further comprising:
receiving a protocol message from the second device over the tunnel;
determining a virtual circuit identifier corresponding to the tunnel; and
forwarding the protocol message to the supported device over the virtual circuit using the virtual circuit identifier.

13. The method of claim 1, wherein maintaining the mapping of the virtual circuit identifier to the tunnel comprises:
maintaining a forwarding table; and
adding to the forwarding table a forwarding entry mapping the virtual circuit identifier to the tunnel.

14. The method of claim 13, further comprising:
receiving a protocol message from the supported device over the virtual circuit, the protocol message including the virtual circuit identifier;
searching the forwarding table for a forwarding entry mapping the virtual circuit identifier to the tunnel; and
forwarding the protocol message to the second device over the tunnel.

15. The method of claim 13, further comprising:
receiving a protocol message from the second device over the tunnel;
searching the forwarding table for a forwarding entry the tunnel to the virtual circuit identifier; and
forwarding the protocol message to the supported device over the virtual circuit using the virtual circuit identifier.

16. The method of claim 1, wherein the interface is a frame relay interface, and wherein the virtual circuit is a frame relay permanent virtual circuit identified by a data link connection identifier.

17. The method of claim 1, wherein the interface is an X.25 interface, and wherein the virtual circuit is an X.25 permanent virtual circuit identified by a virtual channel number.

18. An apparatus for allocating virtual circuits in a communication network, the apparatus comprising:
a network interface operably coupled to support a device;
an Internet Protocol interface operably coupled to an Internet Protocol network; and
communication path logic operably coupled to allocate a virtual circuit having a virtual circuit identifier for communicating with the supported device over the network interface, establish a tunnel over the Internet Protocol interface for communicating with a second device in the communication network, and map the virtual circuit identifier to the tunnel so as to associate the virtual circuit with the tunnel, in response to an address resolution request identifying an initiator and a target.

19. The apparatus of claim 18, wherein the communication path logic is operably coupled to signal a spare virtual circuit to the supported device over the network interface, receive the address resolution request from the supported device over the spare virtual circuit, and allocate the spare virtual circuit for communicating with the second device upon receiving the address resolution request from the supported device over the spare virtual circuit.

20. The apparatus of claim 18, wherein the communication path logic is operably coupled to signal a spare virtual circuit to the supported device over the network interface, receive the address resolution request from the supported device over the spare virtual circuit, forward the address resolution request over the Internet Protocol interface, receive an address resolution response over the Internet Protocol interface, and allocate the spare virtual circuit for communicating with the second device upon receiving the address resolution response over the Internet Protocol interface.

21. The apparatus of claim 18, wherein the communication path logic is operably coupled to signal a spare virtual circuit to the supported device over the network interface, receive an inverse address resolution request from the supported device over the spare virtual circuit, and allocate the spare virtual circuit for communicating with the second device upon receiving the inverse address resolution request from the supported device over the spare virtual circuit.

22. The apparatus of claim 18, wherein the communication path logic is operably coupled to signal a spare virtual circuit to the supported device over the network interface, receive the address resolution request over the Internet Protocol interface, forward the address resolution request to the supported device over the spare virtual circuit, receive an address resolution response from the supported device over the spare virtual circuit, and allocate the spare virtual circuit for communicating with the second device upon receiving the address resolution response from the supported device over the spare virtual circuit.

23. The apparatus of claim 18, wherein the communication path logic is operably coupled to signal a spare virtual circuit to the supported device over the network interface, receive the address resolution request over the Internet Protocol interface, and allocate the spare virtual circuit for communicating with the second device upon receiving the address resolution request over the Internet Protocol interface.

24. The apparatus of claim 23, wherein the communication path logic is operably coupled to forward the address resolution request to the supported device over the spare virtual circuit.

25. The apparatus of claim 18, wherein the communication path logic is operably coupled to receive the address resolution request, allocate a virtual circuit for communicating with the second device upon receiving the address resolution request, and signal the virtual circuit to the supported device over the network interface.

26. The apparatus of claim 18, wherein the communication path logic is operably coupled to receive a protocol message from the supported device over the virtual circuit and forward the protocol message to the second device over the tunnel.

27. The apparatus of claim 18, wherein the communication path logic is operably coupled to receive a protocol message from the second device over the tunnel and forward the protocol message to the supported device over the virtual circuit.

28. The apparatus of claim 18, further comprising a forwarding table mapping each of a number of tunnels to a corresponding virtual circuit identifier.

29. The apparatus of claim 28, wherein the communication path logic is operably coupled to receive a protocol message including a virtual circuit identifier from the supported device over the virtual circuit, search the forwarding table for a tunnel corresponding to the virtual circuit identifier, and forward the protocol message to the second device over the tunnel.

30. The apparatus of claim 28, wherein the communication path logic is operably coupled to receive a protocol message from the second device over the tunnel, search the forwarding table for a virtual circuit identifier corresponding to the tunnel, and forward the protocol message to the supported device over the virtual circuit corresponding to the virtual circuit identifier.

31. The apparatus of claim 18, wherein the network interface is a frame relay interface, and wherein the virtual circuit is a frame relay permanent virtual circuit identified by a data link connection identifier.

32. The apparatus of claim 18, wherein the network interface is an X.25 interface, and wherein the virtual circuit is an X.25 permanent virtual circuit identified by a virtual channel number.

33. A program product comprising a computer readable medium having embodied therein a computer program for allocating virtual circuits by an edge node in a communication network, the computer program comprising:
network interface logic for supporting a device over a network interface;
Internet Protocol interface logic for communicating over an Internet Protocol network; and
communication path logic programmed to allocate a virtual circuit having a virtual circuit identifier for communicating with the supported device over the network interface, establish a tunnel over the Internet Protocol interface for communicating with a second device in the communication network, and map the virtual circuit identifier to the tunnel so as to associate the virtual circuit with the tunnel, in response to an address resolution request identifying an initiator and a target.

34. The program product of claim 33, wherein the communication path logic is programmed to signal a spare virtual circuit to the supported device over the network interface, receive the address resolution request from the supported device over the spare virtual circuit, and allocate the spare virtual circuit for communicating with the second device upon receiving the address resolution request from the supported device over the spare virtual circuit.

35. The program product of claim 33, wherein the communication path logic is programmed to signal a spare virtual circuit to the supported device over the network interface, receive the address resolution request from the supported device over the spare virtual circuit, forward the address resolution request over the Internet Protocol interface, receive an address resolution response over the Internet Protocol interface, and allocate the spare virtual circuit for communicating with the second device upon receiving the address resolution response over the Internet Protocol interface.

36. The program product of claim 33, wherein the communication path logic is programmed to signal a spare virtual circuit to the supported device over the network interface, receive an inverse address resolution request from the supported device over the spare virtual circuit, and allocate the spare virtual circuit for communicating with the second device upon receiving the inverse address resolution request from the supported device over the spare virtual circuit.

37. The program product of claim 33, wherein the communication path logic is programmed to signal a spare virtual circuit to the supported device over the network interface, receive the address resolution request over the Internet Protocol interface, forward the address resolution request to the supported device over the spare virtual circuit, receive an address resolution response from the supported device over the spare virtual circuit, and allocate the spare virtual circuit for communicating with the second device upon receiving the address resolution response from the supported device over the spare virtual circuit.

38. The program product of claim 33, wherein the communication path logic is programmed to signal a spare virtual circuit to the supported device over the network interface, receive the address resolution request over the Internet Protocol interface, and allocate the spare virtual circuit for communicating with the second device upon receiving the address resolution request over the Internet Protocol interface.

39. The program product of claim 38, wherein the communication path logic is programmed to forward the address resolution request to the supported device over the spare virtual circuit.

40. The program product of claim 33, wherein the communication path logic is programmed to receive the address resolution request, allocate a virtual circuit for communicating with the second device upon receiving the address resolution request, and signal the virtual circuit to the supported device over the network interface.

41. The program product of claim 33, wherein the communication path logic is programmed to receive a protocol message from the supported device over the virtual circuit and forward the protocol message to the second device over the tunnel.

42. The program product of claim 33, wherein the communication path logic is programmed to receive a protocol message from the second device over the tunnel and forward the protocol message to the supported device over the virtual circuit.

43. The program product of claim 33, wherein the edge node comprises a forwarding table, and wherein the communication path logic is programmed to maintain forwarding table entries in the forwarding table mapping each of a number of tunnels to a corresponding virtual circuit identifier.

44. The program product of claim 43, wherein the communication path logic is programmed to receive a protocol message including a virtual circuit identifier from the supported device over the virtual circuit, search the forwarding table for a tunnel corresponding to the virtual circuit identifier, and forward the protocol message to the second device over the tunnel.

45. The program product of claim 43, wherein the communication path logic is programmed to receive a protocol message from the second device over the tunnel, search the forwarding table for a virtual circuit identifier corresponding to the tunnel, and forward the protocol message to the supported device over the virtual circuit corresponding to the virtual circuit identifier.

46. The program product of claim 33, wherein the network interface is a frame relay interface and the virtual circuit is a frame relay permanent virtual circuit identified by a data link connection identifier.

47. The program product of claim 34, wherein the network interface is an X.25 interface and the virtual circuit is an X.25 permanent virtual circuit identified by a virtual channel number.

48. A communication system comprising a source node, a local edge node, a first remote edge node, and a destination node, wherein:

the source node is coupled to the local edge node over a first interface;

the local edge node is coupled to the first remote edge node over an Internet Protocol network;

the first remote edge node is coupled to the destination node over a second interface;

the source node sends an address resolution request identifying a target node to the local edge node over the first interface;

the local edge node receives the address resolution request, forwards the address resolution request over the Internet Protocol network, allocates a first virtual circuit having a first virtual circuit identifier for the source node over the first interface, establishes a first tunnel between the local edge node and the first remote edge node over the Internet Protocol network, and maps the first virtual circuit identifier to the first tunnel so as to associate the first virtual circuit with the first tunnel; and the first remote edge node receives the address resolution request from the local edge node, determines that the destination node is the target node identified by the address resolution request, allocates a second virtual circuit having a second virtual circuit identifier for the destination node over the second interface, establishes the first tunnel between the local edge node and the first remote edge node over the Internet Protocol network, and maps the second virtual circuit identifier to the first tunnel so as to associate the second virtual circuit with the first tunnel.

49. The communication system of claim 48, wherein:

the source node sends a unicast protocol message to the local edge node over the first virtual circuit;

the local edge node receives the unicast protocol message over the first virtual circuit and forwards the unicast protocol message to the first remote edge node over the first tunnel; and the first remote edge node receives the unicast protocol message over the first tunnel and forwards the unicast protocol message to the destination node over the second virtual circuit.

50. The communication system of claim 48, wherein:

the first interface is a first frame relay interface;

the first virtual circuit is a first frame relay permanent virtual circuit;

the second interface is a second frame relay interface; and the second virtual circuit is a second frame relay permanent virtual circuit.

51. The communication system of claim 48, wherein:

the first interface is a first X.25 interface;

the first virtual circuit is a first X.25 permanent virtual circuit;

the second interface is a second X.25 relay interface; and the second virtual circuit is a second X.25 permanent virtual circuit.

52. The communication system of claim 48, further comprising a second remote edge node coupled to a third node over a third interface, wherein:

the second remote edge node receives the address resolution request, determines that the third node is not the target node identified by the address resolution request, determines an Internet Protocol address of the third node, establishes a second tunnel between the second remote edge node and the local edge node, allocates a third virtual circuit for the third node over the third interface, and maps the third virtual circuit to the second tunnel.

* * * * *